United States Patent
Hodge et al.

(10) Patent No.: US 10,982,724 B2
(45) Date of Patent: Apr. 20, 2021

(54) CLUTCH CARRIER FOR A TRANSMISSION

(71) Applicant: Schaeffler Technologies AG & Co. KG, Herzogenaurach (DE)

(72) Inventors: Michael Hodge, Creston, OH (US); Kenneth Hunt, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/241,266

(22) Filed: Jan. 7, 2019

(65) Prior Publication Data

US 2019/0219106 A1 Jul. 18, 2019

Related U.S. Application Data

(60) Provisional application No. 62/617,923, filed on Jan. 16, 2018.

(51) Int. Cl.
| | |
|---|---|
| *F16D 13/68* | (2006.01) |
| *F16B 4/00* | (2006.01) |
| *F16D 13/64* | (2006.01) |
| *F16B 21/18* | (2006.01) |

(52) U.S. Cl.
CPC ........... *F16D 13/68* (2013.01); *F16B 21/183* (2013.01); *F16D 13/644* (2013.01); *F16D 13/648* (2013.01); *F16D 13/683* (2013.01); *F16B 4/004* (2013.01); *F16D 2250/0061* (2013.01); *F16D 2250/0084* (2013.01)

(58) Field of Classification Search
CPC ...... F16D 13/68; F16D 13/648; F16D 13/683; F16D 13/644; F16D 13/58; F16D 13/52
See application file for complete search history.

(56) References Cited

U.S. PATENT DOCUMENTS

| | | | |
|---|---|---|---|
| 9,145,929 B2 | 9/2015 | George | |
| 2004/0134740 A1* | 7/2004 | Gerathewohl | ........ F16D 13/683 192/70.2 |
| 2006/0081435 A1 | 4/2006 | Heinrich et al. | |
| 2008/0257678 A1* | 10/2008 | Ari | ......... F16D 13/683 192/112 |
| 2008/0312028 A1 | 12/2008 | Haupt | |
| 2010/0137096 A1* | 6/2010 | Illerhaus | ............... F16D 13/683 475/331 |

(Continued)

FOREIGN PATENT DOCUMENTS

EP 2014943 B1 3/2010

*Primary Examiner* — Ernesto A Suarez
*Assistant Examiner* — Lillian T Nguyen
(74) *Attorney, Agent, or Firm* — LeKeisha M. Suggs

(57) ABSTRACT

A clutch carrier includes a first component and a second component. The first component has an undulating ring, a cylindrical ring, and a connector portion. The undulating ring has an inner surface, and an outer surface for mating engagement with a clutch plate spline. The connector portion is between the undulating ring and the cylindrical ring. A plurality of apertures are defined at least partially in the connector portion. The second component has a first radial wall, a plurality of segments, and a plurality of formable tabs. The plurality of segments extend axially from the first radial wall and contact at least a portion of the inner surface to radially position the second component within the first component. The plurality of formable tabs extend from the first radial wall through the plurality of apertures.

12 Claims, 6 Drawing Sheets

(56) References Cited

U.S. PATENT DOCUMENTS

| | | | |
|---|---|---|---|
| 2011/0067971 A1* | 3/2011 | Ratner | F16D 13/52 |
| | | | 192/70.2 |
| 2013/0256080 A1* | 10/2013 | Luipold | F16D 13/683 |
| | | | 192/69.9 |
| 2017/0102067 A1 | 4/2017 | Sabo et al. | |
| 2017/0292574 A1 | 10/2017 | Hodge | |
| 2018/0066715 A1* | 3/2018 | Cupit | F16D 13/52 |

* cited by examiner

CLUTCH CARRIER FOR A TRANSMISSION

CROSS-REFERENCE TO RELATED APPLICATIONS

This application claims the benefit of U.S. Provisional Application No. 62/617,623 filed Jan. 16, 2018, the entire disclosure of which is incorporated by reference herein.

FIELD

The present disclosure relates generally to a clutch carrier, and more specifically to a clutch carrier component with formed tabs.

BACKGROUND

Clutch carriers are known. One example is shown in commonly-assigned U.S. Pat. No. 9,145,927.

BRIEF SUMMARY

Example aspects broadly comprise a clutch carrier for a transmission including a first component and a second component. The first component has a central axis, an undulating ring, a cylindrical ring, and a connector portion. The undulating ring has a radially inner surface, and a radially outer surface for mating engagement with a clutch plate spline. The cylindrical ring is at least partially disposed radially outside of the undulating ring. The connector portion is between the undulating ring and the cylindrical ring. A plurality of apertures are disposed at least partially in the connector portion. The second component has a first radial wall, a plurality of arcuately shaped segments, and a plurality of formable tabs. The plurality of arcuately shaped segments extend axially from the first radial wall and contact at least a portion of the radially inner surface to radially position the second component within the first component. The plurality of formable tabs extend from the first radial wall through the plurality of apertures.

In an example embodiment, each of the plurality of arcuately shaped segments is circumferentially offset relative to each of the plurality of formable tabs. In some example embodiments, the formable tabs include an unformed diameter and a formed diameter, and the unformed diameter is less than the formed diameter. In an example embodiment, the plurality of apertures each include a radially outermost surface and the formed diameter is larger than a diameter of the radially outermost surfaces. In an example embodiment, the second component is axially displaced relative to the first component when the formable tabs are formed. In an example embodiment, the undulating ring includes a plurality of holes for a cooling oil flow.

In some example embodiments, the second component comprises a conical portion, a tubular section, and a second radial wall. The conical portion extends from a radially inner end of the first radial wall. The tubular section has a first distal end extending from a radially inner end of the conical portion. The second radial wall extends radially inward from a second distal end of the tubular section, opposite the first distal end. In some example embodiments, the second component has a radiused surface connecting the second radial wall to the second distal end. In an example embodiment, the second component has a plurality of holes extending at least partially through the radiused surface. In an example embodiment, the clutch carrier includes a planetary ring gear fixed to the first component at a distal end of the cylindrical ring.

Other example aspects broadly comprise a component for a clutch carrier including a first plate and a first axial bearing. The first plate includes a first radial wall, a conical portion, a tubular section, and a second radial wall. A plurality of arcuately shaped segments extend axially from the first radial wall and a plurality of formable tabs extend from the first radial wall. The conical portion extends from a radially inner end of the first radial wall. The tubular section includes a first distal end extending from a radially inner end of the conical portion and a second distal end, opposite the first distal end. The second radial wall extends radially inward from the second distal end. The second radial wall has first and second axially opposite sides, and an inner circumferential surface.

In some example embodiments, each of the plurality of arcuately shaped segments is circumferentially offset relative to each of the plurality of formable tabs. In some example embodiments, the first axial bearing includes a first axial race, a second axial race, a first cage, and a plurality of rollers. The first axial race has a first radial wall contacting the first axially opposite side and a first circumferential wall contacting the inner circumferential surface. The first plurality of rollers is disposed axially between the first axial race and the second axial race and circumferentially positioned by the first cage.

In some example embodiments, the component includes a second axial bearing with a third axial race, a fourth axial race, a second axial cage, and a second plurality of rollers. The third axial race includes a second radial wall contacting the second axially opposite side and a second circumferential wall contacting the first circumferential wall. The second plurality of rollers is disposed axially between the third axial race and the fourth axial race, and circumferentially positioned by the second cage. In some example embodiments, the component includes a radial bearing with a first radial race, a third cage, and a third plurality of rollers disposed radially inside of the first radial race and circumferentially positioned by the third cage. In an example embodiment, the tubular section includes a first circumferential surface and the first radial race includes a second circumferential surface contacting the first circumferential surface. In some example embodiments, the fourth axial race includes a first radial wall, and the first radial race includes a second radial wall contacting the first radial wall.

Other example aspects broadly comprise a clutch carrier assembly including the component and a carrier ring. The carrier ring has a central axis, an undulating ring, a cylindrical ring, and a connector portion between the undulating ring and the cylindrical ring. The undulating ring includes a radially inner surface, a radially outer surface for mating engagement with a clutch plate spline. The cylindrical ring is at least partially disposed radially outside of the undulating ring. The carrier ring also has a plurality of apertures disposed at least partially in the connector portion. The plurality of arcuately shaped segments contact at least a portion of the radially inner surface to radially position the first plate within the carrier ring, and the plurality of formable tabs extend through the plurality of apertures.

In an example embodiment, the clutch carrier assembly includes a planetary ring gear fixed to the carrier ring at a distal end of the cylindrical ring. In an example embodiment, the formable tabs include an unformed diameter and a formed diameter, the unformed diameter is less than the formed diameter, the plurality of apertures each include a radially outermost surface, and the formed diameter is larger than a diameter of the radially outermost surfaces.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1:
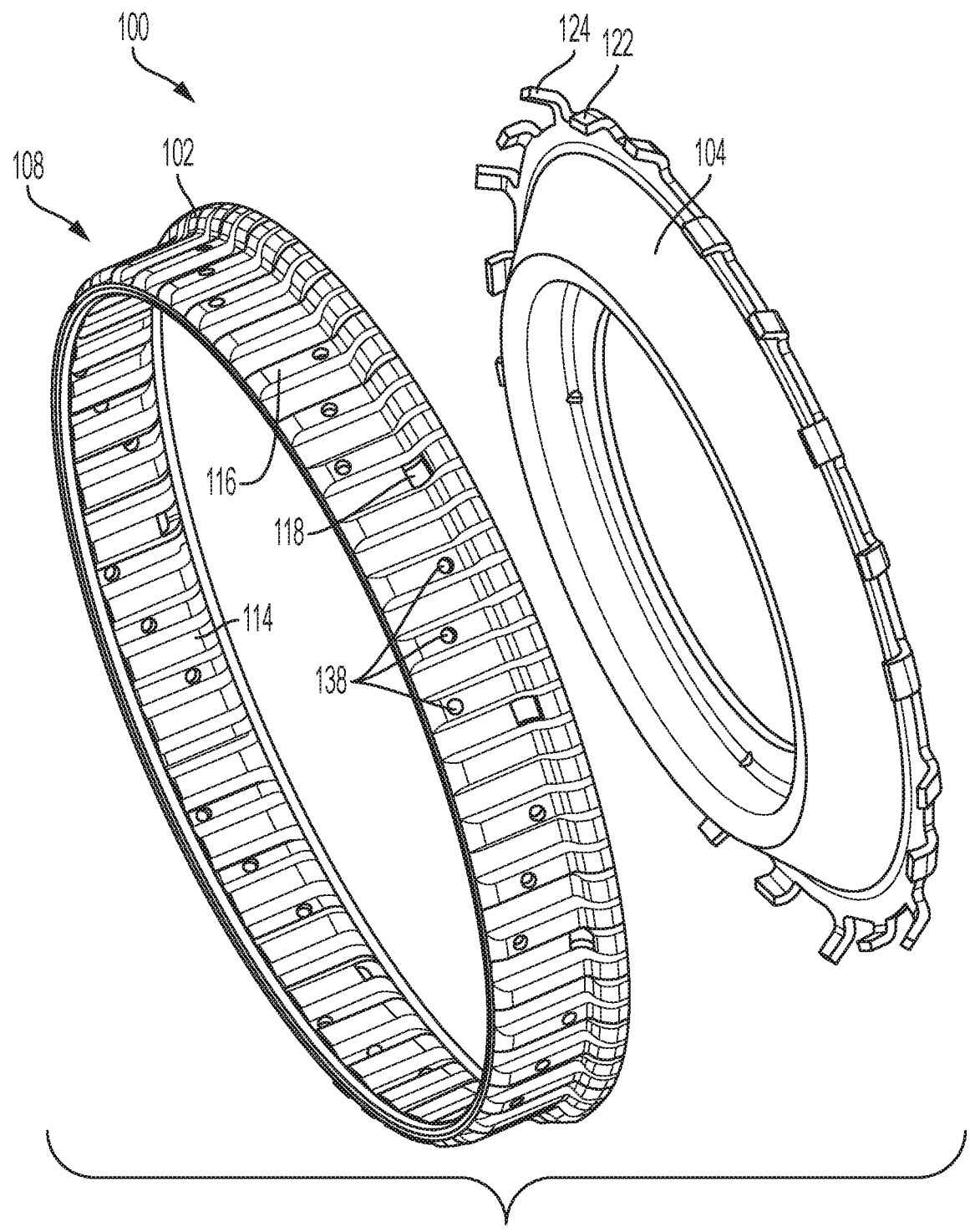
FIG. 1 is a perspective exploded of a clutch carrier according to an example aspect.
Figure 2:
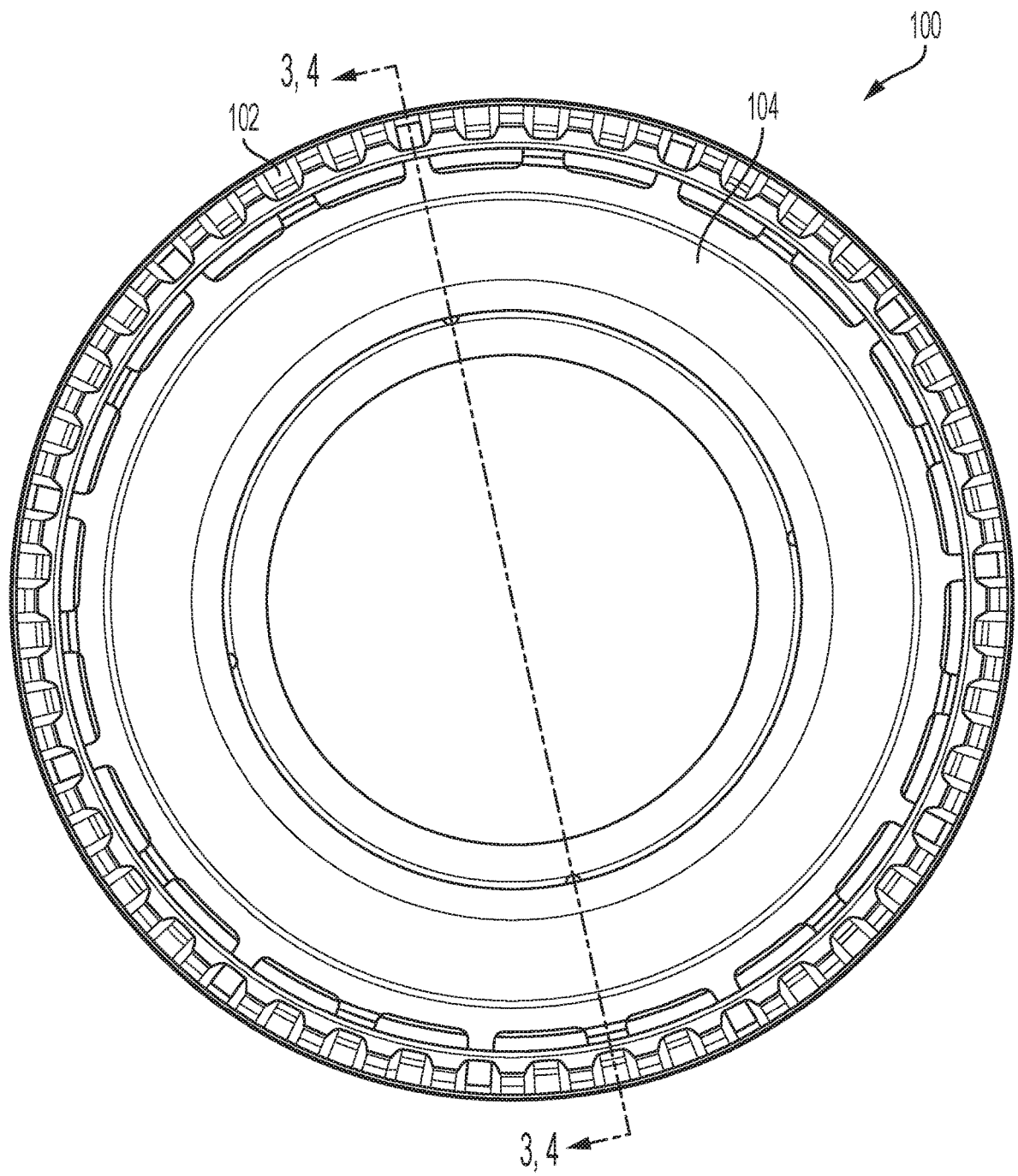
FIG. 2 is a front view of the clutch carrier of FIG. 1.
Figure 3:
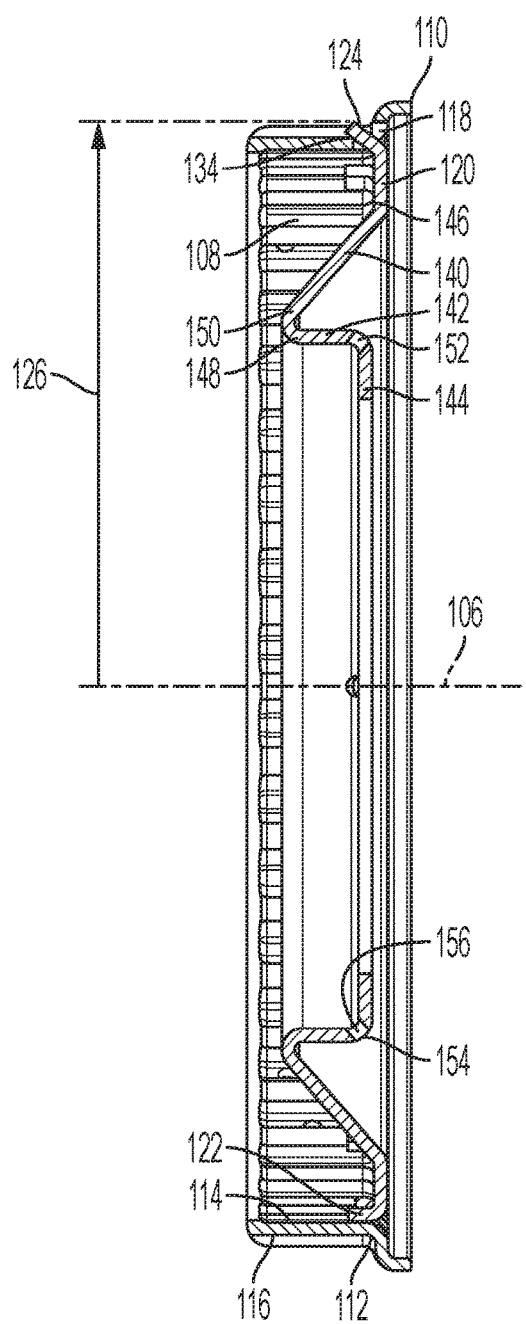
FIG. 3 is a cross-section view of the clutch carrier of FIG. 1 with unformed tabs taken generally along line 3-3 in FIG. 2.
Figure 4:
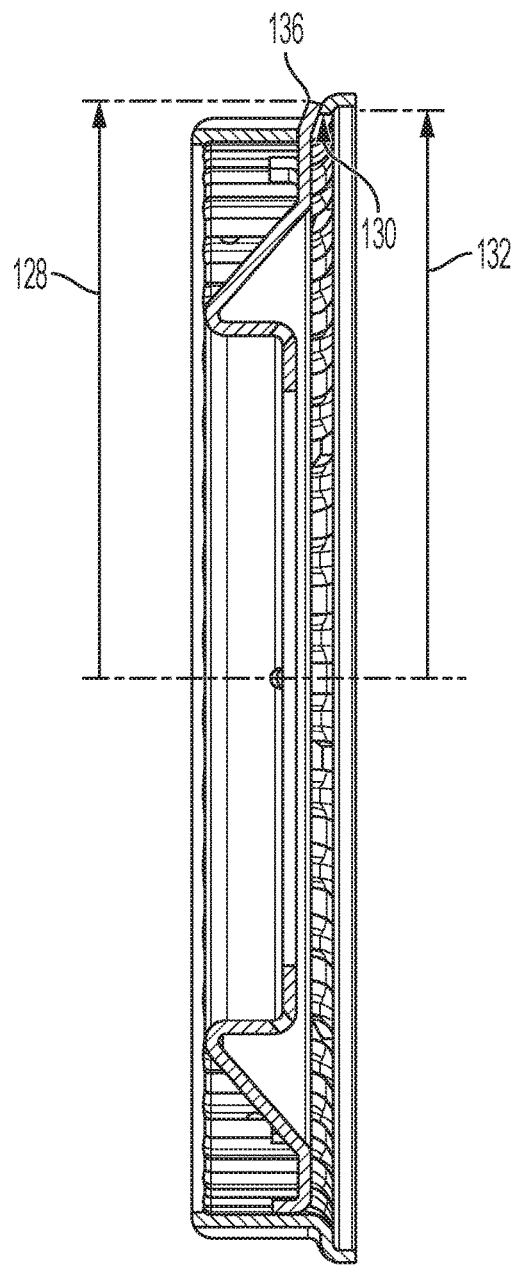
FIG. 4 is a cross-section view of the clutch carrier of FIG. 1 with formed tabs taken generally along line 4-4 in FIG. 2.

The following description is made with reference to FIGS. 1-4. FIG. 1 is a perspective exploded view of clutch carrier 100 according to an example aspect. FIG. 2 is a front view of clutch carrier 100 of FIG. 1. FIG. 3 is a cross-section view of clutch carrier 100 of FIG. 1 with unformed tabs taken generally along line 3-3 in FIG. 2. FIG. 4 is a cross-section view of clutch carrier 100 of FIG. 1 with formed tabs taken generally along line 4-4 in FIG. 2.

Clutch carrier 100 includes component 102 and component, or plate, 104. Component 102 may be formed from a single piece of material. Similarly, component 104 may be formed from a single piece of material. More specifically, components 102 and 104 may be stamped from sheet metal. Clutch carrier 100 may be a clutch carrier for a transmission, for example. In an example embodiment, clutch carrier 100 is a clutch carrier for a planetary automatic transmission. Component 102 includes central axis 106, undulating ring 108, cylindrical ring 110, and connector portion 112. The undulating ring includes radially inner surface 114 and radially outer surface 116 for mating engagement with a clutch plate spline (not shown). That is, a plurality of clutch plates for a clutch pack may be engaged with the undulating ring to transfer torque to or from the undulating ring when the clutch is engaged.

Cylindrical ring 110 is disposed radially outside of the undulating ring 108. Other embodiments (not shown), may include a cylindrical ring disposed only partially radially outside of the undulating ring. The connector portion 112 extends between the undulating ring 108 and the cylindrical ring 110. Apertures 118 are disposed at least partially in the connector portion 112.

Component 104 includes radial wall 120, arcuately shaped segments 122, and formable tabs 124. The arcuately shaped segments 122 extend axially from the radial wall 120 and contact radially inner surface 114 of undulating ring 108 to radially position component 104 within component 102. The formable tabs 124 extend from radial wall 120 through apertures 118. Segments 122 are circumferentially offset relative to formable tabs 124. Formable tabs 124 include unformed diameter 126 (see FIG. 3) and formed diameter 128 (see FIG. 4). Unformed diameter 126 is less than formed diameter 128. Aperture 118 includes radially outermost surface 130. Formed diameter 128 is larger than diameter 132 of the radially outermost surface.

Component 104 is axially displaced relative to component 102 when the formable tabs 124 are formed. The formable tabs 124 allow assembly without additional components. That is, the clutch carrier is assembled by inserting the formable tabs 124 into the apertures 118 and bending the formable tabs 124 to keep the components together. The tabs 124 may be bent by displacing component 104 axially towards a cylindrical fixture (not shown) that circumscribes the undulating ring, for example. Other embodiments may including bending the formable tabs through contact with edge 134 of aperture 118 (see FIG. 3). The formable tabs 124 are bendable until making contact with edge 136 of aperture 118 (see FIG. 4), though material springback may leave a small axial lash between the tab and the aperture.

Undulating ring 108 includes holes 138 for a cooling oil flow (not shown). That is, during operation, it may be desirable for some amount of a transmission oil to flow through the clutch pack (not shown) to keep the plates cool during engagement or slipping conditions. Holes 138 allow a radial flow of oil from inside the undulating ring through the clutch plates. Holes 138 are axially and circumferentially offset to ensure an adequate flow to each of the clutch plates.

Component 104 includes conical portion 140, tubular section 142 and radial wall 144. The conical portion extends from radially inner end 146 of radial wall 120. The tubular section 142 includes distal end 148 extending from radially inner end 150 of the conical portion 140. Radial wall 144 extends radially inward from distal end 152 of the tubular section 142. Distal end 152 is opposite distal end 148. Radiused surface 154 connects radial wall 144 to distal end 152. Holes 156 extend through radiused surface 154.

Figure 5:
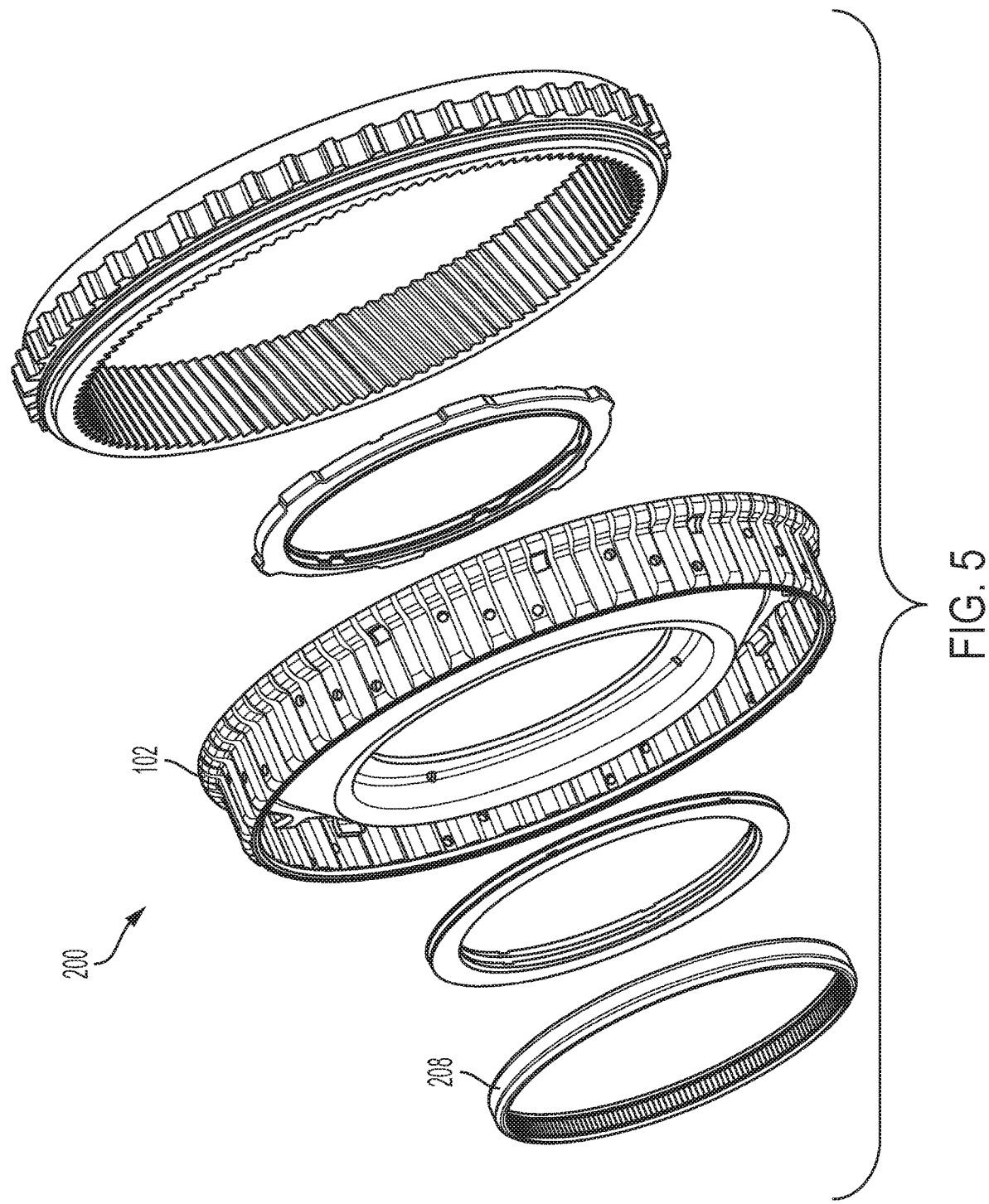
FIG. 5 is a perspective exploded view of a clutch carrier assembly according to an example aspect.
Figure 6:
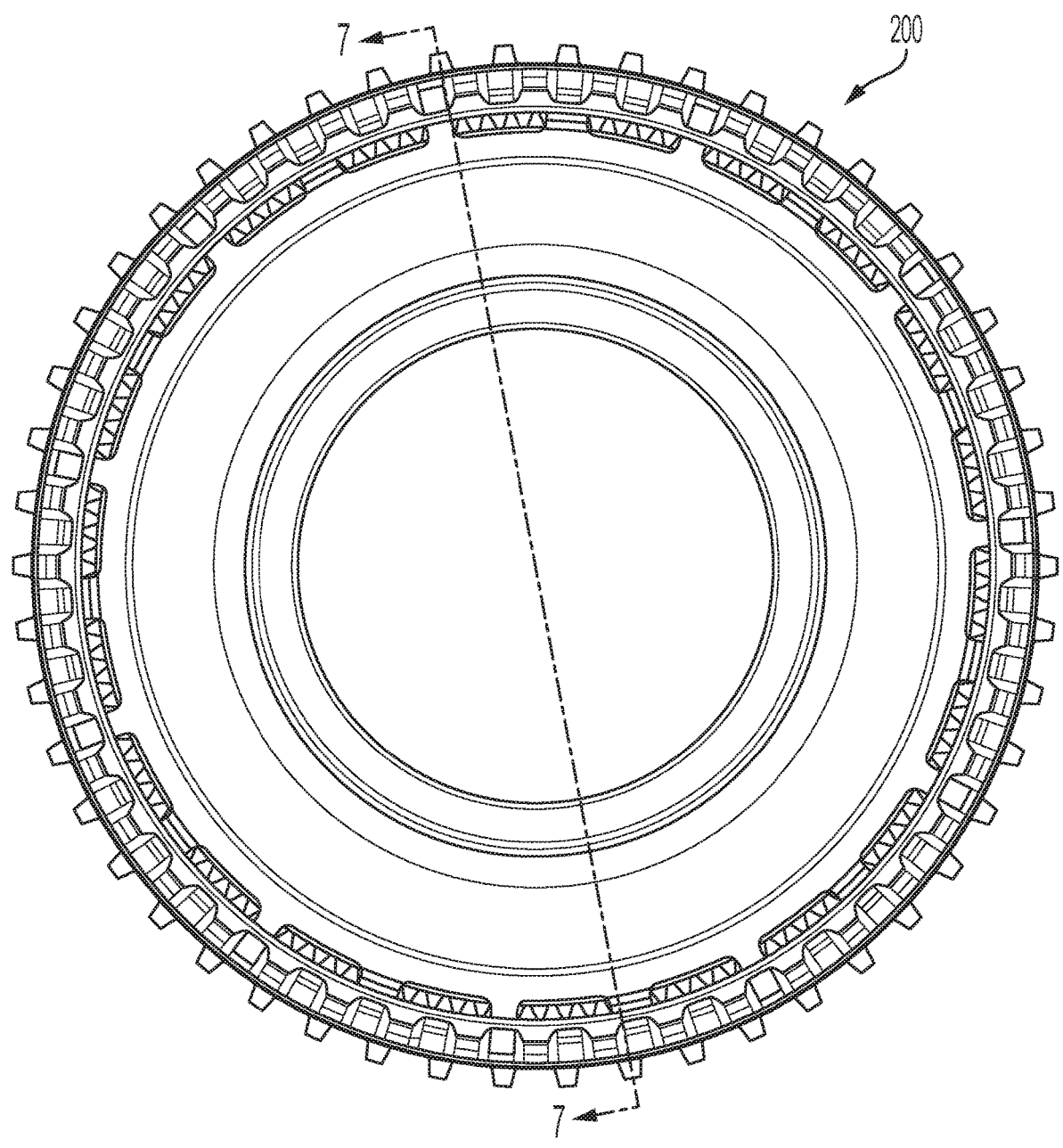
FIG. 6 is a front view of the clutch carrier assembly of FIG. 5.
Figure 8:
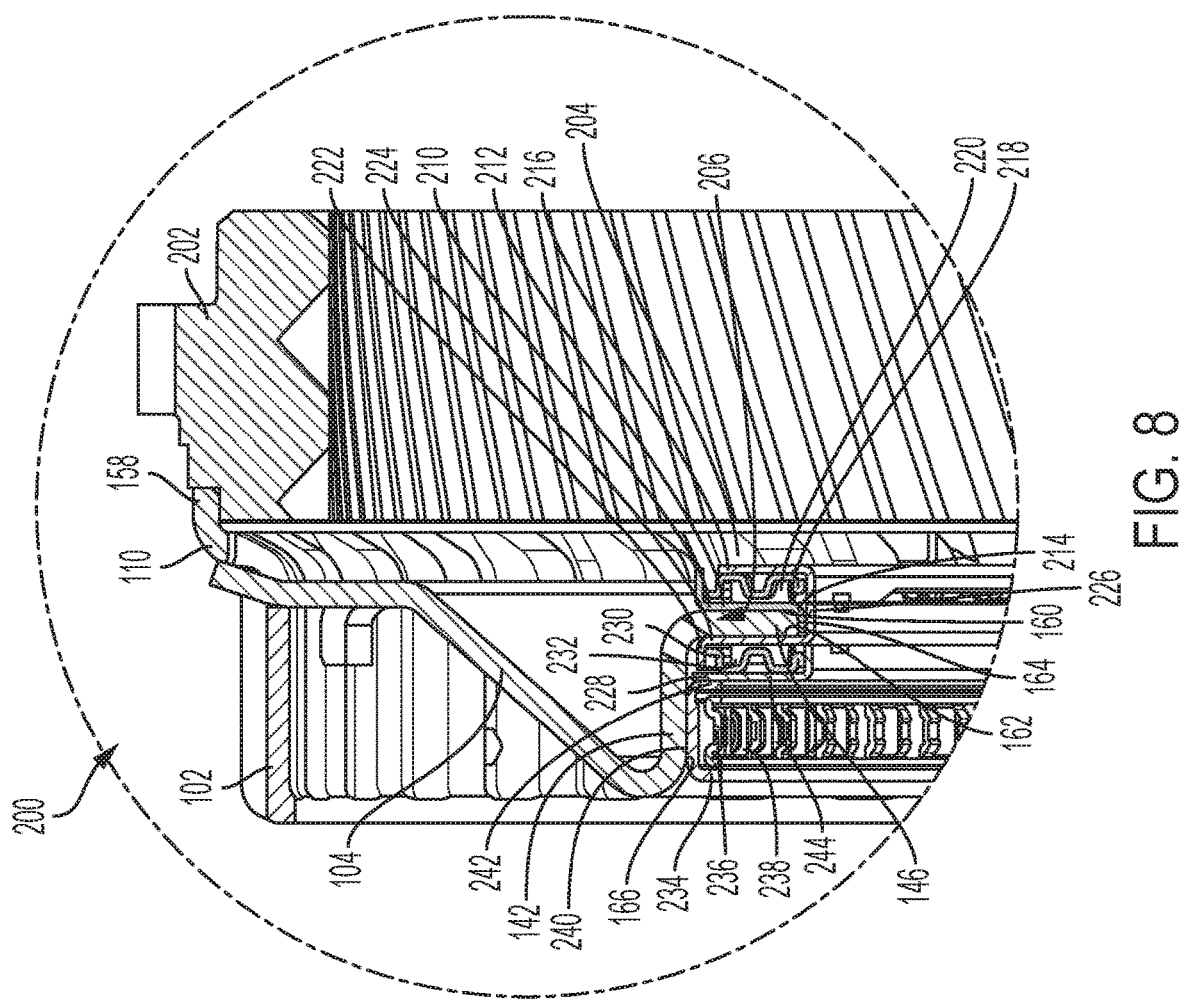
Figure 7:
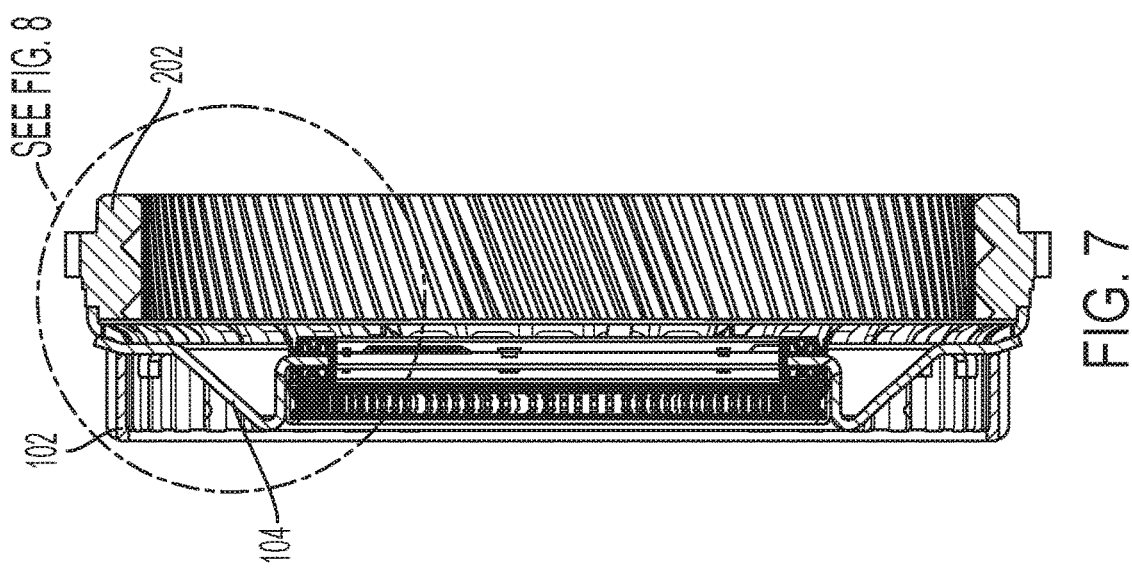
FIG. 7 is a cross-section view of the clutch carrier assembly of FIG. 5 taken generally along line 7-7 in FIG. 6; and, FIG. 8 is a detailed view of encircled region 8 in FIG. 7.

The following description is made with reference to FIGS. 5-8. FIG. 5 is a perspective exploded view of clutch carrier assembly 200 according to an example aspect. FIG. 6 is a front view of clutch carrier assembly 200 of FIG. 5. FIG. 7 is a cross-section view of clutch carrier 200 of FIG. 5 taken generally along line 7-7 in FIG. 6. FIG. 8 is a detailed view of encircled region 8 in FIG. 7.

Clutch carrier assembly 200 includes component 102, component, or plate, 104, and planetary ring gear 202. The planetary ring gear is fixed to component 102 at distal end 158 of cylindrical ring 110 by welding, for example. Clutch carrier assembly 200 further includes axial bearing 204, axial bearing 206, and radial bearing 208. In an example embodiment, the bearings are fixed to plate 104.

Radial wall 146 includes axially opposite sides 160 and 162, and inner circumferential surface 164. Bearing 204 includes axial race 210 with radial wall 212 contacting the side 160 and circumferential wall 214 contacting inner circumferential surface 164. Bearing 204 further includes axial race 216, cage 218, and rollers 220. The rollers 220 are disposed axially between axial race 210 and axial race 216, and circumferentially positioned by cage 218. Axial bearing 206 includes axial race 222 including radial wall 224 contacting side 162, and circumferential wall 226 contacting circumferential wall 214. Bearing 206 further includes axial race 228, cage 230, and rollers 232. Rollers 232 are disposed axially between axial race 222 and axial race 228, and circumferentially positioned by cage 230.

Bearing 208 includes radial race 234, cage 236, and rollers 238. The rollers are disposed radially inside of radial race 234 and circumferentially positioned cage 236. Tubular section 142 includes circumferential surface 166. Radial race 234 includes circumferential surface 240 contacting circumferential surface 166. Axial race 228 includes radial wall 244 and radial race 234 includes radial wall 242 contacting radial wall 244.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

LIST OF REFERENCE NUMERALS

100 Clutch carrier
102 Component
104 Component, plate
106 Central axis
108 Undulating ring
110 Cylindrical ring
112 Connector portion
114 Radially inner surface
116 Radially outer surface
118 Apertures
120 Radial wall
122 Arcuately shaped segments
124 Formable tabs
126 Unformed diameter
128 Formed diameter
130 Aperture outermost surface
132 Aperture surface diameter
134 Aperture edge
136 Aperture edge
138 Holes
140 Conical portion
142 Tubular section
144 Radial wall
146 Radial wall inner end
148 Distal end
150 Inner end
152 Distal end
154 Radiused surface
156 Holes
158 Distal end
160 Axially opposite side
162 Axially opposite side
164 Inner circumferential surface
166 Circumferential surface
200 Clutch carrier assembly
202 Planetary ring gear
204 Axial bearing
206 Axial bearing
208 Radial bearing
210 Axial race
212 Radial wall
214 Circumferential wall
216 Axial race
218 Cage
220 Rollers
222 Axial race
224 Radial wall
226 Circumferential wall
228 Axial race
230 Cage
232 Rollers
234 Radial race
236 Cage
238 Rollers
240 Circumferential wall
242 Radial wall
244 Radial wall

What we claim is:

1. A clutch carrier for a transmission comprising:
a first component including:
an undulating ring having an inner surface and an outer surface;
a cylindrical ring disposed radially outside of the undulating ring; and
a connector portion arranged between the undulating ring and the cylindrical ring, wherein the connector portion defines a plurality of apertures extending therethrough; and
a second component including:
a plurality of segments extending in an axial direction from a first radial wall and contacting the inner surface of the undulating ring to radially position the second component within the first component; and
a plurality of formable tabs extending from the first radial wall through the plurality of apertures.

2. The clutch carrier of claim 1, wherein each of the plurality of segments is circumferentially offset relative to each of the plurality of formable tabs.

3. The clutch carrier of claim 1, wherein:
each of the formable tabs includes an unformed diameter and a formed diameter; and
the unformed diameter is less than the formed diameter.

4. The clutch carrier of claim 3, wherein each of the apertures includes a radially outermost surface and the formed diameter is larger than a diameter of the radially outermost surface.

5. The clutch carrier of claim 3, wherein the second component is axially displaced relative to the first component when the formable tabs are formed.

6. The clutch carrier of claim 1, wherein the undulating ring includes a plurality of holes arranged for a cooling oil flow.

7. The clutch carrier of claim 1, wherein the second component further comprises:
a conical portion extending from a radially inner end of the first radial wall;
a tubular section with a first distal end extending from a radially inner end of the conical portion; and, a second radial wall extending radially inward from a second distal end of the tubular section, opposite the first distal end.

8. The clutch carrier of claim 7, wherein the second component further comprises a radiused surface connecting the second radial wall to the second distal end, and a plurality of holes extending at least partially through the radiused surface.

9. The clutch carrier of claim 1, further comprising a planetary ring gear fixed to the first component at a distal end of the cylindrical ring.

10. A clutch carrier for a transmission comprising:
a first component including an undulating ring and a cylindrical ring disposed radially outside of the undulating ring; and
a second component including a plurality of segments extending in an axial direction from a first radial wall and contacting an inner surface of the undulating ring to radially position the second component within the first component, wherein a plurality of formable tabs extend from the first radial wall through a plurality of apertures defined in the first component.

11. The clutch carrier of claim 10, wherein the first component further includes a connector portion between the undulating ring and the cylindrical ring, the plurality of apertures being defined at least partially in the connector portion.

12. The clutch carrier of claim 10, wherein the segments are arcuately shaped and are circumferentially offset relative to each of the plurality of formable tabs.

* * * * *